United States Patent
Huh

(10) Patent No.: US 12,517,393 B2
(45) Date of Patent: Jan. 6, 2026

(54) DISPLAY DEVICE AND A METHOD OF MANUFACTURING THE SAME

(71) Applicant: SAMSUNG DISPLAY CO., LTD., Yongin-si (KR)

(72) Inventor: Su Jung Huh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/614,888

(22) Filed: Mar. 25, 2024

(65) Prior Publication Data

US 2025/0004320 A1    Jan. 2, 2025

(30) Foreign Application Priority Data

Jun. 30, 2023    (KR) .................. 10-2023-0085162

(51) Int. Cl.
| | | |
|---|---|---|
| *G02F 1/1337* | (2006.01) | |
| *G02B 30/28* | (2020.01) | |
| *G02F 1/1334* | (2006.01) | |
| *G02F 1/1335* | (2006.01) | |

(52) U.S. Cl.
CPC ....... *G02F 1/133526* (2013.01); *G02B 30/28* (2020.01); *G02F 1/1334* (2013.01); *G02F 1/133528* (2013.01); *G02F 1/1337* (2013.01)

(58) Field of Classification Search
CPC ............. G02F 1/133526; G02F 1/1334; G02F 1/133528; G02F 1/1337; G02F 1/1333; G02F 1/133305; G02F 1/13363; G02B 30/28; G02B 30/25; G02B 30/26; G09F 9/30; H04N 13/302; H10K 59/879

See application file for complete search history.

(56) References Cited

U.S. PATENT DOCUMENTS

| | | | |
|---|---|---|---|
| 8,144,390 B2 | 3/2012 | Nam et al. | |
| 8,953,127 B2 | 2/2015 | Shin et al. | |
| 9,596,458 B2 | 3/2017 | Smith et al. | |
| 2017/0277012 A1* | 9/2017 | Huh ..................... | G02F 1/29 |
| 2022/0365398 A1* | 11/2022 | Nakamura ......... | G02F 1/133342 |

FOREIGN PATENT DOCUMENTS

| | | | |
|---|---|---|---|
| CN | 100582868 | 1/2010 | |
| KR | 10-0784080 | 12/2007 | |
| KR | 10-1658793 | 9/2016 | |
| KR | 10-1812511 | 1/2018 | |
| WO | WO-2012020628 A1 * | 2/2012 | ......... G02B 27/2214 |

OTHER PUBLICATIONS

English Machine Translation of Tokuhisa et al WO 2012/020628 (Year: 2025).*

* cited by examiner

*Primary Examiner* — Donald L Raleigh
(74) *Attorney, Agent, or Firm* — F. CHAU & ASSOCIATES, LLC

(57) ABSTRACT

A display device including: a display panel; a polarization layer on the display panel; a liquid crystal layer on the polarization layer; an alignment layer on the liquid crystal layer; and a lens layer on the alignment layer, wherein the lens layer includes polymerized liquid crystal molecules having a plurality of azimuthal angles.

20 Claims, 13 Drawing Sheets

FIG. 9
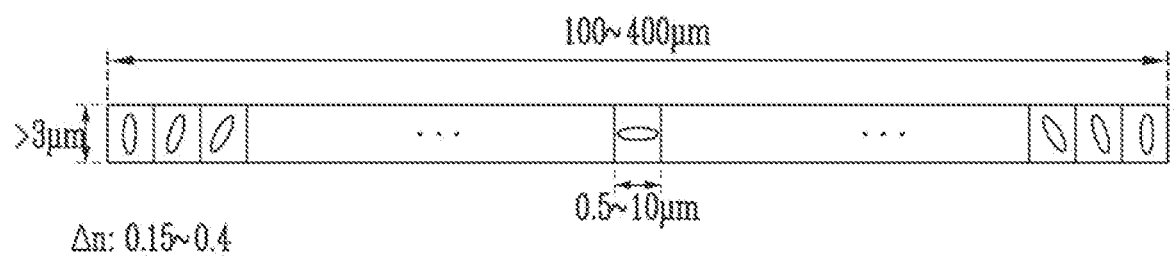
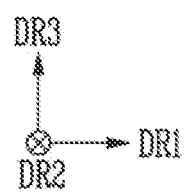

DISPLAY DEVICE AND A METHOD OF MANUFACTURING THE SAME

CROSS-REFERENCE TO RELATED APPLICATION

The present application claims priority under 35 U.S.C. § 119 to Korean patent application number 10-2023-0085162 filed on Jun. 30, 2023, the disclosure of which is incorporated by reference herein in its entirety.

TECHNICAL FIELD

Various embodiments of the present disclosure relate to a display device and a method of manufacturing the display device.

DESCRIPTION OF RELATED ART

As information technology has advanced, the role of display devices as an intermediary between users and information has become increasingly significant. Reflecting their importance, there has been a surge in the diversity and use of display devices, such liquid crystal displays and organic light-emitting displays.

A stereoscopic image display device is designed to replicate the physical cues that our eyes would receive from a real object, thereby stimulating the viewer's visual sense to perceive depth and create the illusion of a three-dimensional (3D) image. For example, the stereoscopic image display device may provide different images to the left and right eyes of the viewer so that the viewer can view the stereoscopic image by leveraging binocular parallax between the left and right eyes. The stereoscopic image display device may also provide a multi-view image.

Recently, there have been developed display devices that offer the versatility of switching between a 3D mode for displaying stereoscopic images and a two-dimensional (2D) mode for displaying 2D images.

Furthermore, recent research and development efforts have been directed towards display devices that are foldable, bendable, and rollable display device. Such display devices may be applied to applications across a wide range of areas, not limited to portable electronic devices and wearable devices, but also to televisions and monitors.

SUMMARY

Various embodiments of the present disclosure are directed to a display device that minimizes the distortion of liquid crystal molecules even if a lens layer is bent or folded.

Various embodiments of the present disclosure are directed to a method of manufacturing such a display device.

An embodiment of the present disclosure provides a display device including: a display panel; a polarization layer on the display panel; a liquid crystal layer on the polarization layer; an alignment layer on the liquid crystal layer; and a lens layer on the alignment layer, wherein the lens layer includes polymerized liquid crystal molecules having a plurality of azimuthal angles.

At least one of the liquid crystal molecules includes a reactive mesogen.

The lens layer includes a plurality of unit lenses, and at least one of the unit lenses has a refractive index corresponding to a gradient-index (GRIN) lens for light polarized by the polarization layer.

The lens layer includes a plurality of unit lens, and the azimuthal angles of the liquid crystal molecules in at least one of the unit lenses decreases in a first direction.

A maximum value of the azimuthal angles is 90°, and a minimum value of the azimuthal angles is −90°.

A liquid crystal molecule having an azimuthal angle of 0° has a higher refractive index for light polarized by the polarization layer than a liquid crystal molecule having an azimuthal angle of 90°.

The lens layer includes a plurality of unit lenses, and at least one of the unit lenses has a refractive index corresponding to a Fresnel lens for light polarized by the polarization layer.

The lens layer includes a plurality of unit lenses, at least one of the unit lenses includes a first lens region and a second lens region, the azimuthal angles of the liquid crystal molecules in the first lens region and the second lens region decrease in a first direction, a maximum value of the azimuthal angles of the liquid crystal molecules in the second lens region adjacent to the first lens region in a direction opposite to the first direction is 90°, and a minimum value of the azimuthal angles of the liquid crystal molecules in the second lens region adjacent to the first lens region in the first direction is −90°.

The at least one of the unit lenses includes an adjacent region positioned between the first lens region and the second lens region, and the azimuthal angle of a liquid crystal molecule in the adjacent region is identical to the azimuthal angle of a liquid crystal molecule in the second lens region adjacent to the adjacent region.

The lens layer includes a plurality of unit lenses, and a length of at least one of the unit lenses is greater than or identical to 100 μm and less than or identical to 400 μm.

The lens layer includes a plurality of sub-unit lenses each including one of the liquid crystal molecules, and a length of at least one of the sub-unit lenses is greater than or identical to 0.5 μm and less than or identical to 10 μm.

A thickness of the lens layer is greater than 3 μm.

A birefringence of the lens layer is greater than or identical to 0.15 and less than or identical to 0.4.

The liquid crystal layer includes a polymer dispersed liquid crystal (PDLC) layer.

The liquid crystal layer scatters light polarized by the polarization layer in a two-dimensional (2D) mode, and allows light polarized by the polarization layer to pass therethrough in a three-dimensional (3D) mode.

An embodiment of the present disclosure provides a method of manufacturing a display device including: forming a display panel; forming a polarization layer on the display panel; forming a liquid crystal layer on the polarization layer; forming an alignment layer on the liquid crystal layer; and forming a lens layer on the alignment layer, wherein the lens layer is formed by polymerizing liquid crystal molecules having a plurality of azimuthal angles.

At least one of the liquid crystal molecules includes a reactive mesogen.

The lens layer includes a plurality of unit lenses, and at least one of the unit lenses has a refractive index corresponding to a GRIN lens for light polarized by the polarization layer.

The lens layer includes a plurality of unit lenses, and at least one of the unit lenses has a refractive index corresponding to a Fresnel lens for light polarized by the polarization layer.

The liquid crystal layer includes a PDLC layer.

In a display device in accordance with embodiments of the present disclosure, liquid crystal molecules are polymerized to be used as a lens layer, thereby minimizing the distortion of the liquid crystal molecules that can occur when the lens layer is bent or folded.

BRIEF DESCRIPTION OF THE DRAWINGS

FIGS. 8 and 9 are diagrams for describing a unit lens of FIG. 6.

DETAILED DESCRIPTION OF THE EMBODIMENTS

Figure 1:
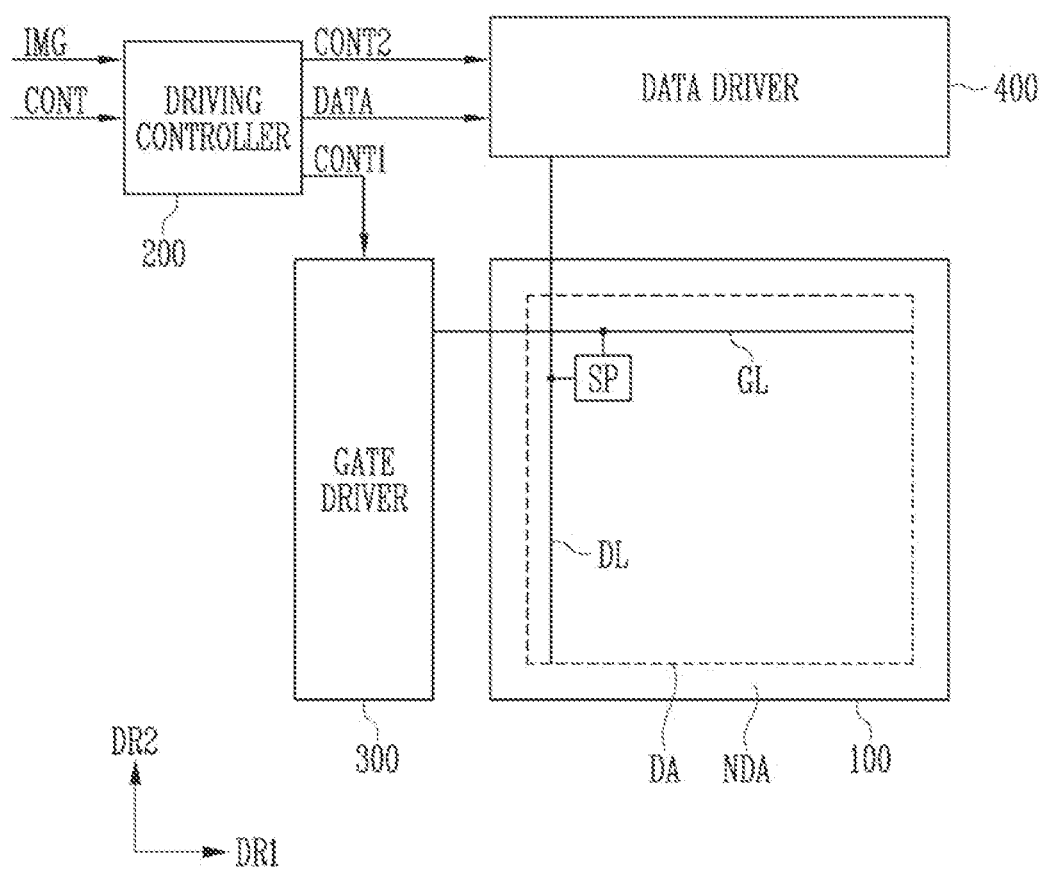
FIG. 1 is a block diagram illustrating a display device in accordance with embodiments of the present disclosure.

Hereinafter, embodiments of the present disclosure will be described in detail with reference to the attached drawings. It is to be understood, however, that the present disclosure is not limited to the embodiments set forth herein but it may be embodied in other forms.

It will also be understood that when an element is referred to as being "coupled" or "connected" to another element, it can be directly coupled or connected to the other element or intervening elements may be present therebetween. The terminology used herein is for the purpose of describing particular embodiments and is not intended to be limiting. In the specification, when an element is referred to as "comprising" or "including" a component, it does not preclude another component but may further include other components unless the context clearly indicates otherwise. As used herein, "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element.

Spatially relative terms, such as "beneath," "below," "under," "lower," "above," "upper," "over," "higher," "side" (e.g., as in "sidewall"), and the like, may be used herein for descriptive purposes, and, thereby, to describe one element or feature's relationship to another element(s) or feature(s), as illustrated in the drawings. Spatially relative terms may encompass different orientations of an apparatus in use, operation, and/or manufacture in addition to the orientation depicted in the drawings. For example, if the device in the drawings is turned upside down, elements described as "below" or "beneath" other elements or features would then be oriented "above" the other elements or features. Thus, the term "below" can encompass both an orientation of above and below. Furthermore, the device may be otherwise oriented (e.g., rotated 90 degrees or at other orientations), and, as such, the spatially relative descriptors used herein interpreted accordingly.

Various embodiments will be described with reference to diagrams illustrating idealized embodiments. As such, variations from the shapes of the illustrations as a result, for example, of manufacturing techniques and/or tolerances, are to be expected. Therefore, embodiments disclosed herein should not be construed as limited to the particular illustrated shapes of regions, but are to include deviations in shapes that result from, for instance, manufacturing. As such, the shapes illustrated in the drawings may not illustrate the actual shapes of regions of a device, and, as such, are not intended to be limiting.

FIG. 1 is a block diagram illustrating a display device in accordance with embodiments of the present disclosure.

Referring to FIG. 1, the display device may include a display panel 100, a driving controller 200, a gate driver 300, and a data driver 400. In an embodiment, the driving controller 200 and the data driver 400 may be integrated into a single chip.

The display panel 100 may include a display area DA in which an image is displayed, and a non-display area NDA disposed adjacent to the display area DA. In an embodiment, the gate driver 300 may be mounted in the non-display area NDA.

The display panel 100 may include a plurality of gate lines GL, a plurality of data lines DL, and a plurality of sub-pixels SP electrically connected to the gate lines GL and the data lines DL. The gate lines GL may extend in a first direction DR1. The data lines DL may extend in a second direction DR2 that intersects with the first direction DR1.

The driving controller 200 may receive input image data IMG and an input control signal CONT from a processor {e.g., a graphic processing unit (GPU)}. For example, the input image data IMG may include red image data, green image data, and blue image data. In an embodiment, the input image data IMG may further include white image data. In another example, the input image data IMG may include magenta image data, yellow image data, and cyan image data. The input control signal CONT may include a master clock signal and a data enable signal. The input control signal CONT may include a vertical synchronization signal and a horizontal synchronization signal.

The driving controller 200 may generate a first control signal CONT1, a second control signal CONT2, and a data signal DATA, based on the input image data IMG and the input control signal CONT. In other words, the driving controller 200 may generate the first control signal CONT1, the second control signal CONT2, and the data signal DATA, in response to the input image data IMG and the input control signal CONT.

The driving controller 200 may generate the first control signal CONT1 for controlling the operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling the operation of the data driver 400 based on the input control signal CONT, and output the second control signal CONT2 to the data driver 400. The second control signal CONT2 may include a horizontal start signal and a load signal.

The driving controller 200 may receive the input image data IMG and the input control signal CONT and generate the data signal DATA. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages by converting the data signal DATA into analog voltages. The data driver 400 may output the data voltages to the data line DL.

Figure 2:
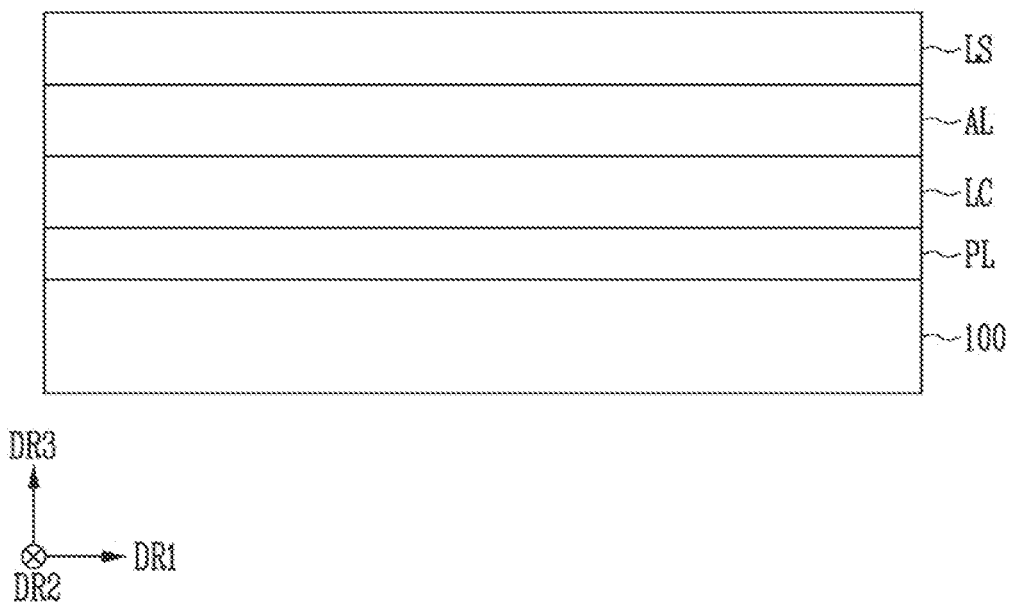
FIG. 2 is a diagram illustrating an example of the display device of FIG. 1.
Figure 3:
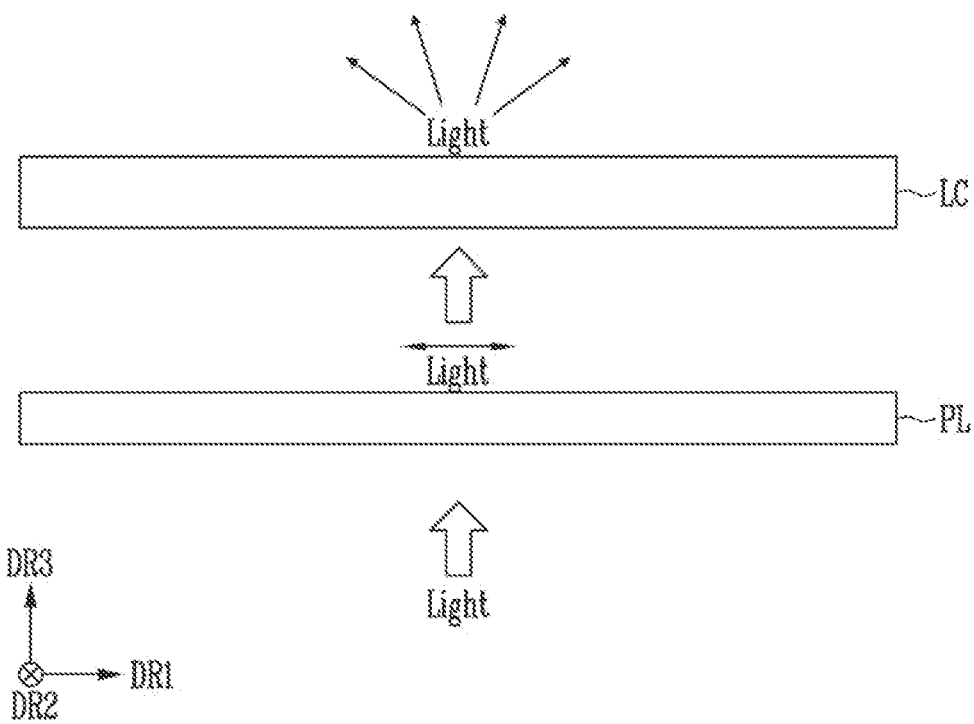
FIG. 3 is a diagram illustrating an example where the display device of FIG. 1 is operated in a two-dimensional (2D) mode.
Figure 4:
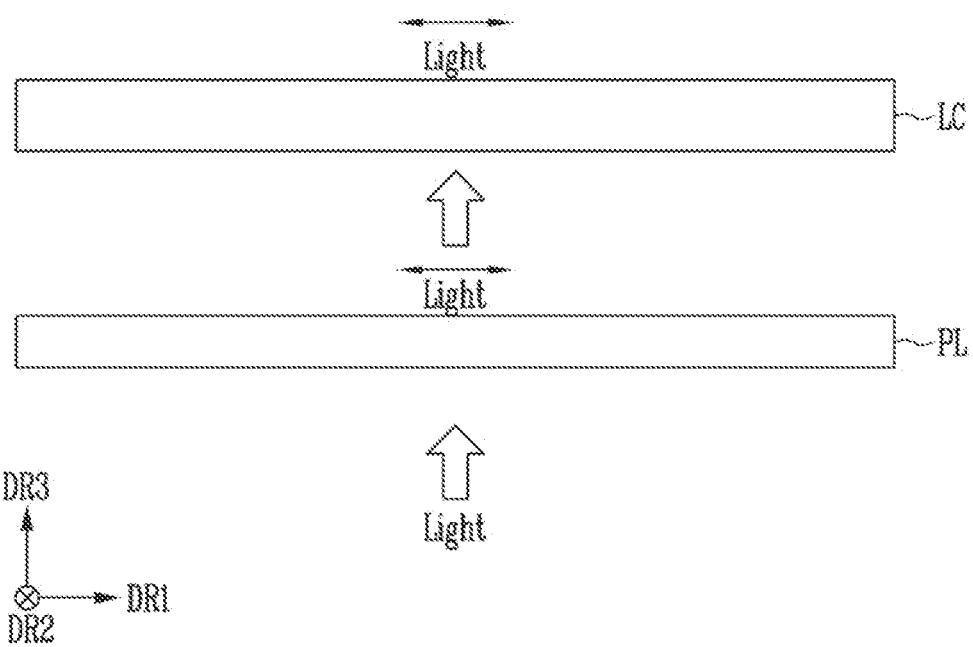
FIGS. 4 and 5 are diagrams illustrating an example where the display device of FIG. 1 is operated in a three-dimensional (3D) mode.
Figure 5:
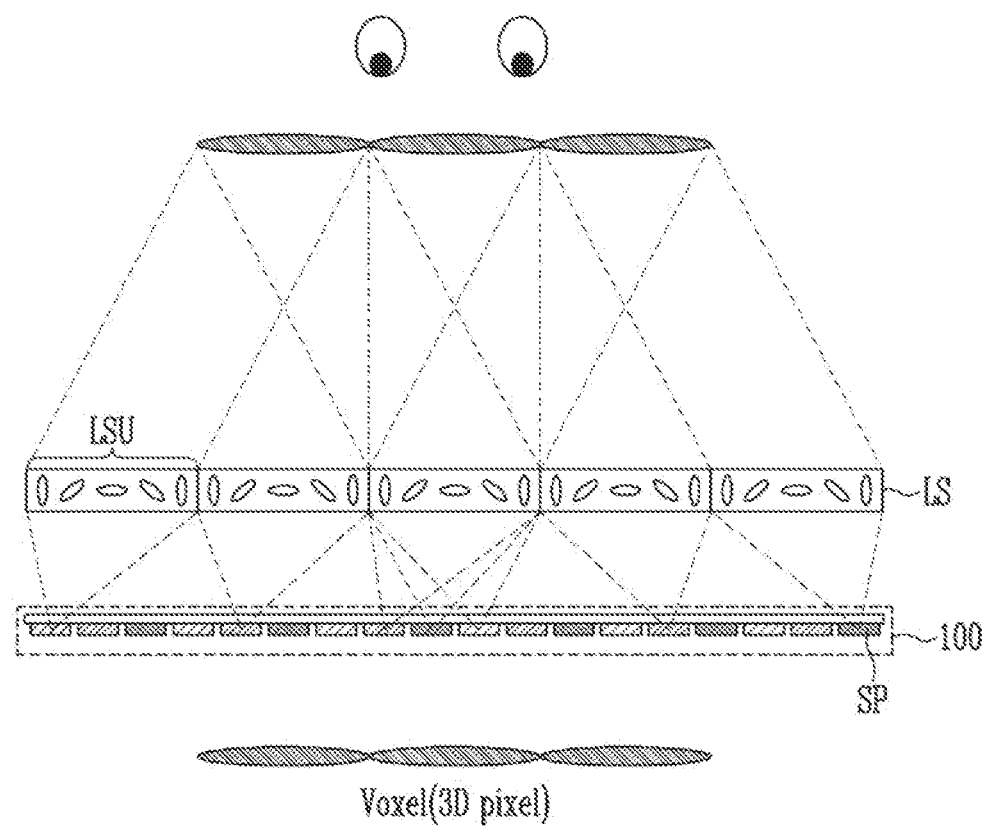

FIG. 2 is a diagram illustrating an example of the display device of FIG. 1. FIG. 3 is a diagram illustrating an example where the display device of FIG. 1 is operated in a two-dimensional (2D) mode. FIGS. 4 and 5 are diagrams illustrating an example where the display device of FIG. 1 is operated in a three-dimensional (3D) mode.

Referring to FIG. 2, the display device may include the display panel 100, a polarization layer PL positioned on the display panel 100, a liquid crystal layer LC positioned on the polarization layer PL, an alignment layer AL positioned on the liquid crystal layer LC, and a lens layer LS positioned on the alignment layer AL. As shown in FIG. 2, the display panel 100, the polarization layer PL, the liquid crystal layer LC, the alignment layer AL and the lens layer LS are arranged in sequence.

Referring to FIGS. 3 to 5, the polarization layer PL may polarize light provided from the display panel 100. For example, the polarization layer PL may polarize light provided from the display panel 100 in a direction parallel to the first direction DR1.

Light polarized by the polarization layer PL may be provided to the liquid crystal layer LC. The liquid crystal layer LC may be a polymer dispersed liquid crystal (PDLC) layer. For example, the liquid crystal layer LC may be operated in different manners depending on the mode. The liquid crystal layer LC may be in direct contact with the polarization layer PL.

The display device may be operated in the 2D mode or the 3D mode. In the 2D mode, viewers may perceive two-dimensional images. In the 3D mode, the viewers may perceive three-dimensional stereoscopic images. For example, the mode of the display device may be determined by a user who uses the display device. For example, the display device may receive data about the mode of the display device from the processor.

For example, the liquid crystal layer LC may be positioned on a first electrode. A second electrode may be positioned on the liquid crystal layer LC. The display device may provide a voltage to the first electrode and the second electrode in the 3D mode, without providing voltages to the first electrode and the second electrode in the 2D mode.

For example, in the 2D mode as shown in FIG. 3, the liquid crystal molecules in the liquid crystal layer LC may be arranged in random directions to scatter incident light. The lens layer LS has a refractive index that varies depending on the polarization direction of light. Hence, the lens layer LS may not refract scattered light in a specific direction. As a result, in the 2D mode, the display device cannot provide a stereoscopic image to the user.

For example, in the 3D mode as shown in FIG. 4, the display device may apply a voltage to the first electrode and the second electrode, creating an electric field in the liquid crystal layer LC. Due to the electric field, the liquid crystal molecules of the liquid crystal layer LC may be aligned in the direction of the incident light. In this case, the refractive index of the liquid crystal layer LC for incident light may be minimized. Accordingly, scattering of the incident light can be minimized. Therefore, most of the incident light may pass through the liquid crystal layer LC intact. In addition, the lens layer LS may refract polarized light in a specific direction. As a result, in the 3D mode, the display device can provide a stereoscopic image to the user.

Hereinafter, referring to FIG. 5, the operation in the 3D mode will be described in detail.

Referring to FIG. 5, the display panel 100 may include sub-pixels SP configured to emit light to display an image. In an embodiment, each of the sub-pixels SP may emit one among light of a first color (e.g., red), light of a second color (e.g., green), and light of a third color (e.g., blue). However, the aforementioned example is merely illustrative, and the color of the light emitted from the sub-pixels SP is not limited thereto. For example, various colors of light may be outputted to implement a full-color image. The display panel 100 may include an organic light emitting display panel, a liquid crystal display panel, a quantum dot display panel, or the like.

The lens layer LS is disposed on the display panel 100, and may refract light incident from the sub-pixels SP. For example, the lens layer LS overlaps the display panel 100 and may refract light incident from the sub-pixels SP in the 3D mode.

A light field display is a 3D display device which forms a light field expressed by vector distribution (e.g., intensity, direction) of light on space using a flat panel display and a lens layer to embody a stereoscopic image. The light field display is a display technology that is expected to find widespread application when integrated with augmented reality systems and similar technologies. This is because the light field display enables a user to perceive the depth and side surfaces of objects, creating a more natural stereoscopic image.

In an embodiment, as illustrated in FIG. 5, the display device may display a stereoscopic image (e.g., a 3D image) by forming the light field.

A series of sub-pixels SP may be allocated to each unit lens LSU of the lens layer LS, and light emitted from each of the sub-pixels SP may be refracted by the unit lens LSU. This use of the unit lens LSU allows the light to only travel in a specific direction, thereby forming a light field expressed by the intensity and direction of the light. When a viewer looks at the display device in the light field formed by the foregoing method, the viewer can experience a three-dimensional effect of a corresponding image.

Image information according to a viewpoint of the viewer in the light field may be defined and processed on a voxel basis. The voxel may be graphic information that defines a certain point (or pixel) in a 3D space.

Figure 6:
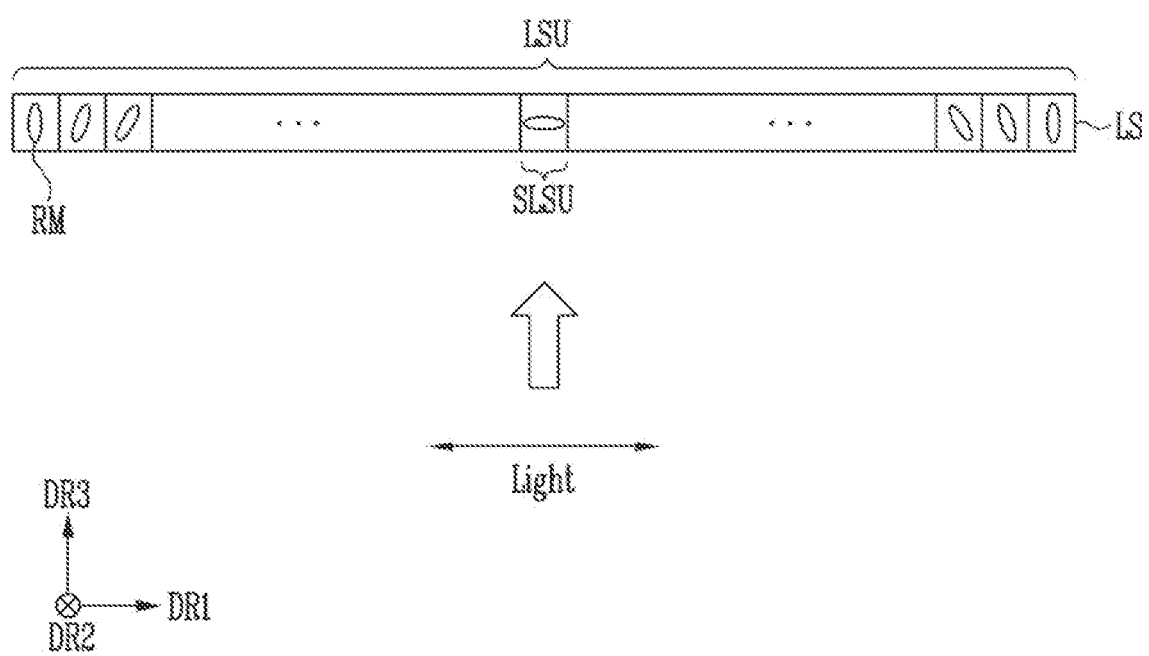
FIG. 6 is a diagram illustrating an example of a unit lens of the display device of FIG. 1.
Figure 7:
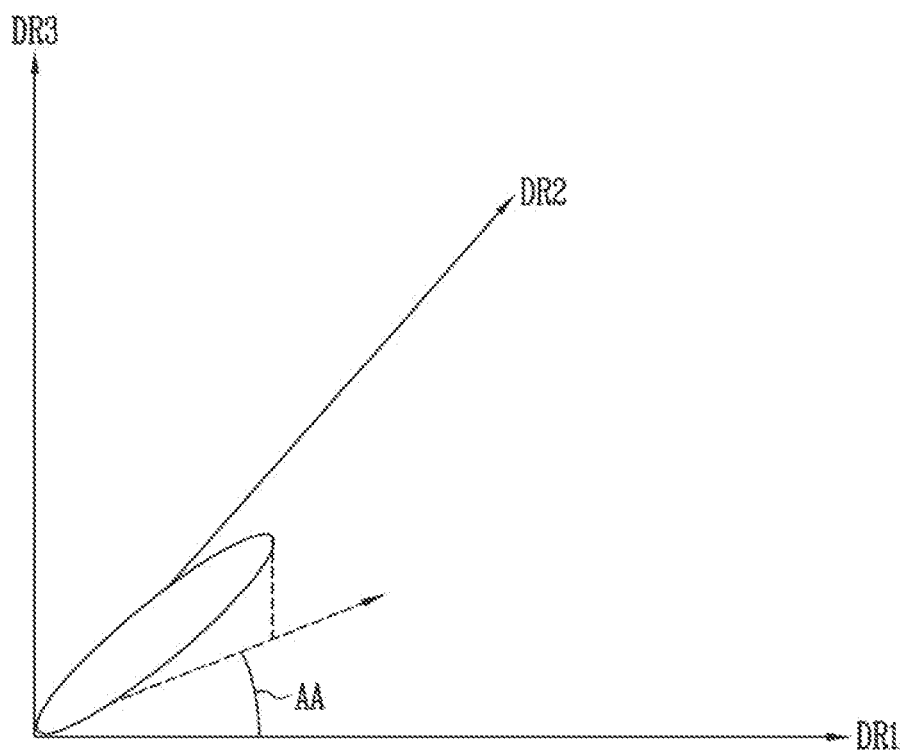
FIG. 7 is a diagram for describing an azimuthal angle of a liquid crystal molecule.
Figure 8:
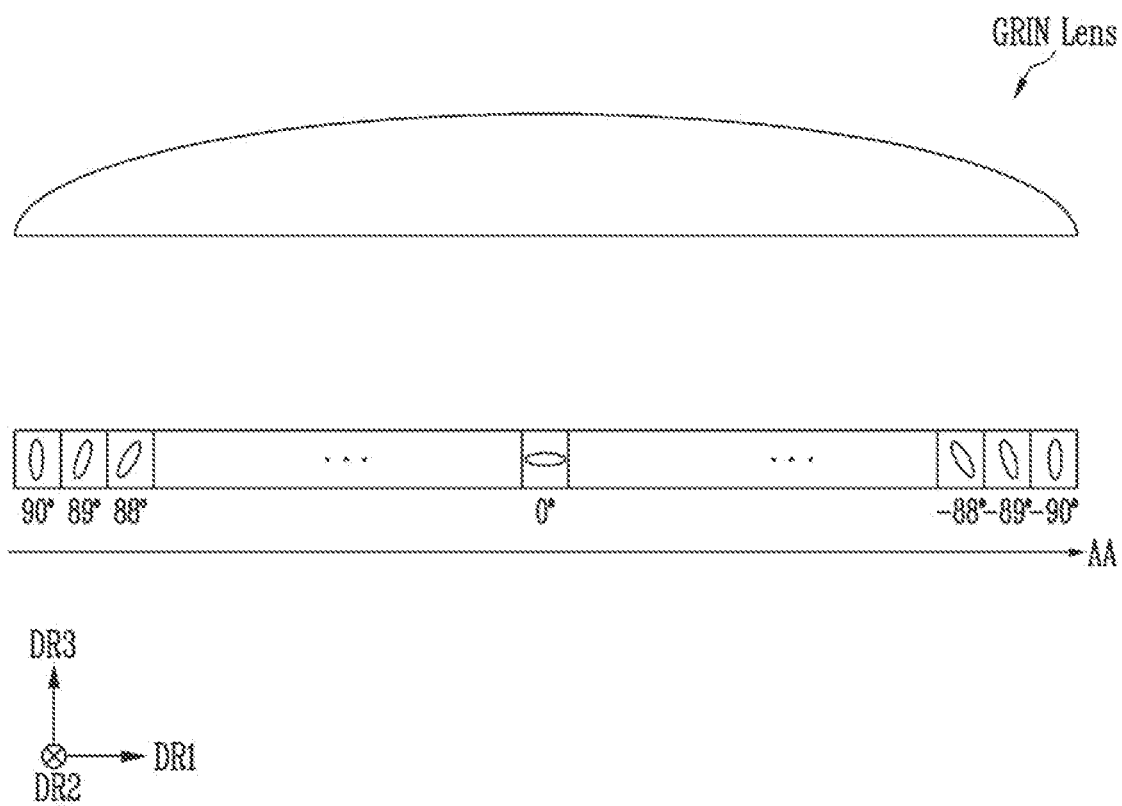

FIG. 6 is a diagram illustrating an example of the unit lens LSU of the display device of FIG. 1. FIG. 7 is a diagram for describing an azimuthal angle of a liquid crystal molecule. FIGS. 8 and 9 are diagrams for describing the unit lens LSU of FIG. 6.

In FIGS. 8 and 9, reference numerals have been omitted, but in the following description of these figures, the same reference numerals as FIG. 6 will be used.

Referring to FIG. 6, the lens layer LS may include a plurality of unit lenses LSU. Each unit lens LSU may embody a single gradient-index (GRIN) lens or a Fresnel lens, which will be described below. However, the present disclosure is not limited in the type of lens implemented by a single unit lens LSU.

The unit lens LSU may include a plurality of sub-unit lenses SLSU. Each sub-unit lens SLSU may include a single liquid crystal molecule RM.

For example, the liquid crystal molecules RM may be arranged in the first direction DR1 in the lens layer LS. For instance, the polarization layer (e.g., PL of FIG. 2 or 4) may emit, in a third direction DR3, light polarized in the direction parallel to the first direction DR1. The polarized light may be incident on the lens layer LS.

At least one of the liquid crystal molecules RM may include optically anisotropic material. For example, the liquid crystal molecules RM may have different optical properties in different directions. At least one of the liquid crystal molecules RM may include a monomer that can be cured by a polymerization reaction induced by light such as ultraviolet light. For example, at least one of the liquid crystal molecules RM may include a reactive mesogen.

The lens layer LS formed by polymerizing reactive mesogens may have birefringent properties and maintain uniform alignment (e.g., the azimuthal angle AA). For example, the lens layer LS generated by polymerizing reactive mesogens may form polymer components. In this case, even when the lens layer LS is bent or folded, the distortion of the liquid crystal molecules RM can be minimized. Hence, the lens layer LS may be used in various display devices such as a foldable display device, a bendable display device, and a rollable display device.

Although for the convenience of explanation, in FIGS. 6, 8, and 9, the liquid crystal molecules RM have been illustrated as being separated from each other, all of the liquid crystal molecules RM may be connected to each other by a photo-induced polymerization reaction while maintaining their orientation.

Referring to FIGS. 6 and 7, the azimuthal angle AA may be an angle formed between the first direction DR1 and the liquid crystal molecule RM projected perpendicular to the plane formed by the first direction DR1 and the second direction DR2. For example, in the case where the azimuthal angle AA is 0°, the liquid crystal molecule RM may be aligned in the first direction DR1 when the liquid crystal molecule RM is projected perpendicular to the plane formed by the first direction DR1 and the second direction DR2. For example, in the case where the azimuthal angle AA is 90°, the liquid crystal molecule RM may be aligned in the second direction DR2 when the liquid crystal molecule RM is projected perpendicular to the plane formed by the first direction DR1 and the second direction DR2. For example, in the case where the azimuthal angle AA is −90°, the liquid crystal molecule RM may be aligned in a direction opposite to the second direction DR2 when the liquid crystal molecule RM is projected perpendicular to the plane formed by the first direction DR1 and the second direction DR2.

Referring to FIGS. 6 and 8, the lens layer LS may be formed by polymerizing the liquid crystal molecules RM having a plurality of azimuthal angles AA. At least one of the unit lenses LSU may have a refractive index corresponding to a GRIN lens for light polarized by the polarization layer (e.g., PL of FIG. 2 or 4). In other words, at least one of the unit lenses LSU may embody a GRIN lens.

The liquid crystal molecules RM of the at least one of the unit lenses LSU may decrease in azimuthal angles AA in the first direction DR1. A maximum value of the azimuthal angles AA may be 90°. A minimum value of the azimuthal angles AA may be −90°.

For example, the azimuthal angle AA of the liquid crystal molecules RM in a first layer of the unit lens LSU may be 90°. The azimuthal angle AA of the liquid crystal molecules RM of the unit lens LSU may decrease to −90° as the azimuthal angle AA of the liquid crystal molecules RM moves from the first layer in the first direction DR1.

Among the liquid crystal molecules RM, the liquid crystal molecule RM having an azimuthal angle of 0° may have a higher refractive index for light polarized by the polarization layer than the liquid crystal molecule RM having an azimuthal angle of 90°.

In the case where the azimuthal angle AA of the liquid crystal molecule RM is 0°, the alignment direction of the liquid crystal molecule RM may match with the polarization direction of light. In this case, the refractive index for the polarized light may be maximized. In the case where the azimuthal angle AA of the liquid crystal molecule RM is 90° or −90°, the alignment direction of the liquid crystal molecule RM may be perpendicular to the polarization direction of light. In this case, the refractive index for the polarized light may be minimized. Here, the alignment direction may correspond to the direction of a major axis of the liquid crystal molecule RM.

As such, various refractive indices may be distributed in the unit lens LSU. Due to a difference in refractive index, the unit lens LSU may function as a lens. In other words, the unit lens LSU may refract polarized light in a specific direction. Particularly, in the scenario where the unit lens LSU exhibits the lowest refractive index at its ends with the refractive index increasing toward the center, the unit lens LSU can function as a GRIN lens.

Referring to FIGS. 6 and 9, for example, at least one of the unit lenses LSU may have a length greater than or identical to 100 μm and less than or identical to 400 μm. For example, at least one of the sub-unit lenses SLSU may have a length greater than or identical to 0.5 μm and less than or identical to 10 μm.

For example, the lens layer LS may have a thickness greater than 3 μm. For example, the lens layer LS may have a birefringence (Δn) greater than or identical to 0.15 and less than or identical to 0.4 (e.g., 0.15~0.4).

Figure 10:
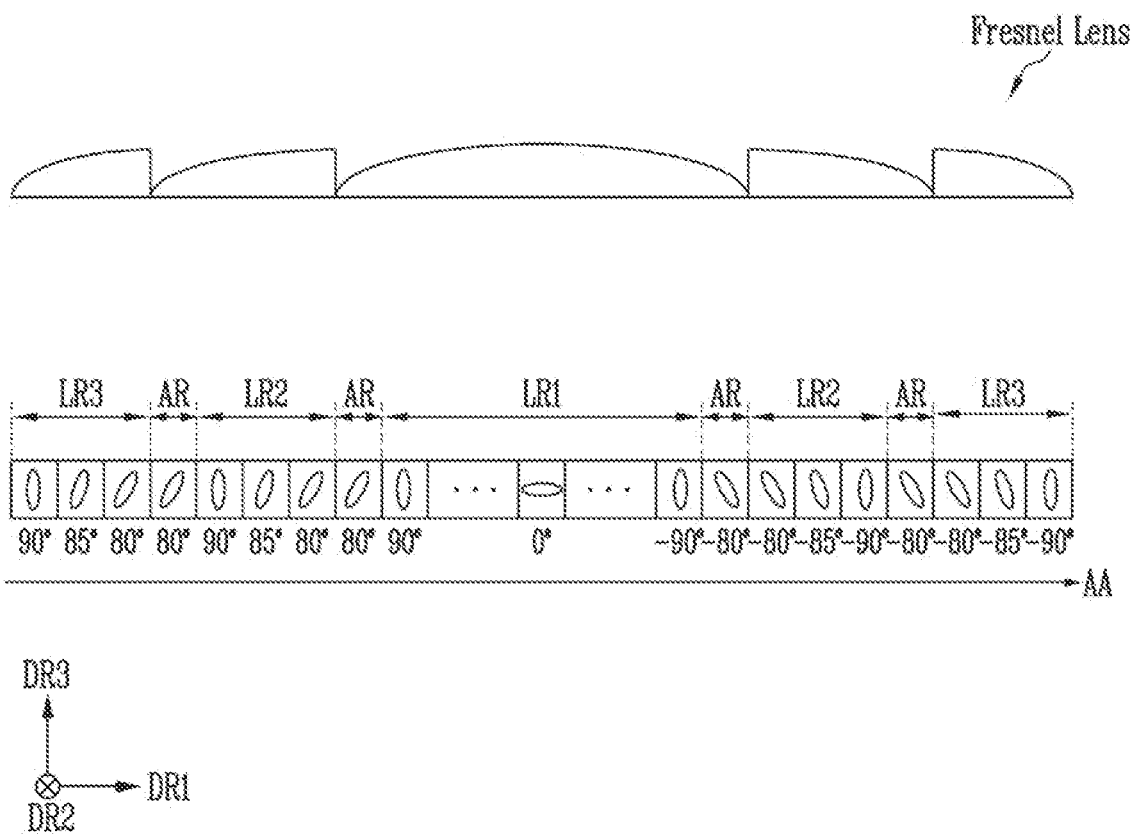
FIG. 10 is a diagram illustrating a unit lens of a display device in accordance with embodiments of the present disclosure.

FIG. 10 is a diagram illustrating the unit lens LSU of the display device in accordance with embodiments of the present disclosure.

The configuration of the unit lens LSU in accordance with the present embodiments is substantially the same as that of the unit lens LSU of FIG. 6, other than the azimuthal angle AA; therefore, identical or similar components are denoted by the same reference numerals and symbols, and redundant explanations thereof may be omitted.

In FIG. 10, reference numerals have been omitted, but in the following description of FIG. 10, the same reference numerals as FIG. 6 will be used.

Although for the convenience of explanation, in FIG. 10, the liquid crystal molecules RM have been illustrated as being separated from each other, all of the liquid crystal molecules RM may be connected to each other by a photo-induced polymerization reaction while maintaining their orientation.

Referring to FIGS. 6 and 10, the lens layer LS may be formed by polymerizing the liquid crystal molecules RM having a plurality of azimuthal angles AA. At least one of the unit lenses LSU may have a refractive index corresponding to a Fresnel lens for light polarized by the polarization layer (e.g., PL of FIG. 2 or 4).

At least one of the unit lenses LSU may include a first lens region LR1 and a second lens region LR2. The first lens region LR1 may be spaced apart from the second lens region LR2. The liquid crystal molecules RM in the first lens region LR1 and the second lens region LR2 may decrease in azimuthal angles AA in the first direction DR1. A maximum value of the azimuthal angles AA of the liquid crystal molecules RM in the second lens region LR2 adjacent to the first lens region LR1 in the direction opposite to the first direction DR1 (e.g., the left side in FIG. 10) may be 90°. A minimum value of the azimuthal angles AA of the liquid crystal molecules RM in the second lens region LR2 adjacent to the first lens region LR1 in the first direction DR1 (e.g., the right side in FIG. 10) may be −90°. The aforementioned structure may also be applied to a third lens region LR3. For example, a maximum value of the azimuthal angles AA of the liquid crystal molecules RM in the third lens region LR3 adjacent to the second lens region LR2 in the direction opposite to the first direction DR1 (e.g., the left side in FIG. 10) may be 90°. A minimum value of the azimuthal angles AA of the liquid crystal molecules RM in the third lens region LR3 adjacent to the second lens region LR2 in the first direction DR1 (e.g., the right side in FIG. 10) may be −90°.

In the present embodiment, the unit lens LSU has been illustrated as being divided into the first lens region LR1, the second lens region LR2, and the third lens region LR3, but the present disclosure is not limited in this number of lens regions.

For example, the azimuthal angle AA of the liquid crystal molecules RM in the first layer in the first lens region LR1 may be 90°. The azimuthal angle AA of the liquid crystal molecules RM in the first lens region LR1 may decrease to −90° as the azimuthal angle AA of the liquid crystal molecules RM moves from the first layer in the first direction DR1.

For example, the azimuthal angle AA of the liquid crystal molecules RM in the first layer in the second lens region LR2 adjacent to the first lens region LR1 in the direction opposite to the first direction DR1 may be 90°. The azimuthal angle AA of the liquid crystal molecules RM in the second lens region LR2 may decrease as the azimuthal angle AA of the liquid crystal molecules RM moves from the first layer in the first direction DR1.

For example, the azimuthal angle AA of the liquid crystal molecules RM in the first layer in the second lens region LR2 adjacent to the first lens region LR1 in the first direction DR1 may be −90°. The azimuthal angle AA of the liquid crystal molecules RM in the second lens region LR2 may increase as the azimuthal angle AA of the liquid crystal molecules RM moves from the first layer in the direction opposite to the first direction DR1.

For example, the azimuthal angle AA of the liquid crystal molecules RM in a first layer in the third lens region LR3 adjacent to the second lens region LR2 in the direction opposite to the first direction DR1 may be 90°. The azimuthal angle AA of the liquid crystal molecules RM in the third lens region LR3 may decrease as the azimuthal angle AA of the liquid crystal molecules RM moves from the first layer in the first direction DR1.

For example, the azimuthal angle AA of the liquid crystal molecules RM in the first layer in the third lens region LR3 adjacent to the second lens region LR2 in the first direction DR1 may be −90°. The azimuthal angle AA of the liquid crystal molecules RM in the third lens region LR3 may increase as the azimuthal angle AA of the liquid crystal molecules RM moves from the first layer in the direction opposite to the first direction DR1.

At least one of the unit lenses LRU may include an adjacent region AR positioned between the first, second and third lens regions LR1, LR2, and LR3. The adjacent region AR positioned between the first lens region LR1 and the second lens region LR2 may have the same azimuthal angle AA as the liquid crystal molecule RM in the second lens region LR2 adjacent to the adjacent region AR. For example, the adjacent region AR positioned between the first lens region LR1 and the second lens region LR2 may have the same azimuthal angle AA of −80° or 80° as the liquid crystal molecule RM in the second lens region LR2 adjacent to the adjacent region AR. The adjacent region AR positioned between the second lens region LR2 and the third lens region LR3 may have the same azimuthal angle AA as the liquid crystal molecule RM in the third lens region LR3 adjacent to the adjacent region AR. For example, the adjacent region AR positioned between the second lens region LR2 and the third lens region LR3 may have the same azimuthal angle AA of −80° or 80° as the liquid crystal molecule RM in the third lens region LR3 adjacent to the adjacent region AR. In other words, the refractive index may remain unchanged in the adjacent region AR. Therefore, the adjacent region AR may implement portions of a Fresnel lens with an inclination angle of 90°.

For example, the azimuthal angle AA of the adjacent region AR that is adjacent to the second lens region LR2 in the first direction DR1 may be identical to 80°, which is the azimuthal angle AA of the liquid crystal molecules RM in the second lens region LR2 adjacent to the adjacent region AR. For example, the azimuthal angle AA of the adjacent region AR that is adjacent to the third lens region LR3 in the first direction DR1 may be identical to 80°, which is the azimuthal angle AA of the liquid crystal molecules RM in the third lens region LR3 adjacent to the adjacent region AR.

As illustrated in FIGS. 8 and 10, the unit lens LSU that implements a Fresnel lens may have a larger difference in azimuthal angle AA between adjacent liquid crystal molecules RM, compared to the unit lens LSU that implements a GRIN lens.

Among the liquid crystal molecules RM, the liquid crystal molecule RM having an azimuthal angle AA of 0° may have a higher refractive index for light polarized by the polarization layer than the liquid crystal molecule RM having an azimuthal angle AA of 90°.

In the case where the azimuthal angle AA of the liquid crystal molecule RM is 0°, the alignment direction of the liquid crystal molecule RM may match the polarization direction of light. In this case, the refractive index for the polarized light may be maximized. In the case where the azimuthal angle AA of the liquid crystal molecule RM is 90° or −90°, the alignment direction of the liquid crystal molecule RM may be perpendicular to the polarization direction of light. In this case, the refractive index for the polarized light may be minimized.

As such, various refractive indices may be distributed in the unit lenses LSU. Due to a difference in refractive index, the unit lens LSU may function as a lens. In other words, the unit lens LSU may refract polarized light in a specific direction. Particularly, in the case where the unit lens LSU has the same refractive index as in FIG. 10, the unit lens LSU may implement a Fresnel lens.

Figure 11:
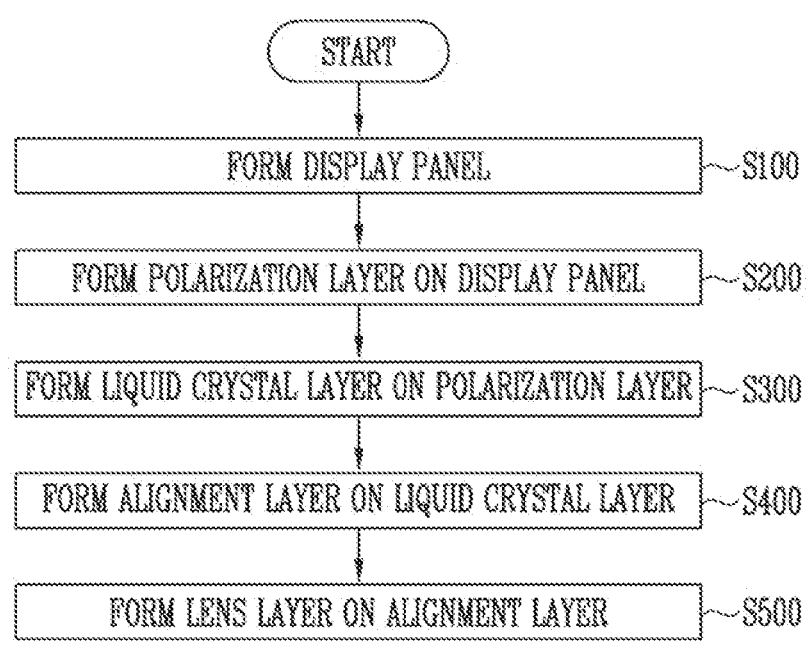
FIG. 11 is a flowchart illustrating a method of manufacturing the display device in accordance with embodiments of the present disclosure.
Figure 12:
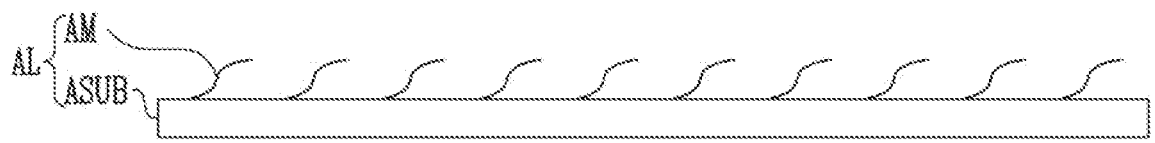
FIGS. 12, 13, 14 and 15 are diagrams illustrating a process of forming an alignment layer according to the method of manufacturing the display device of FIG. 11.

FIG. 11 is a flowchart illustrating a method of manufacturing the display device in accordance with embodiments of the present disclosure. FIGS. 12 to 15 are diagrams illustrating a process of forming the alignment layer according to the method of manufacturing the display device of FIG. 11.

Referring to FIG. 11, the method of manufacturing the display device may include step S100 of forming a display panel, step S200 of forming a polarization layer on the display panel, step S300 of forming a liquid crystal layer on the polarization layer, step S400 of forming an alignment layer on the liquid crystal layer, and step S500 of forming a lens layer on the alignment layer. These steps may be performed in sequence.

Referring to FIGS. 11 to 15, in the method of manufacturing the display device, the alignment layer AL may be formed on the liquid crystal layer, at step S400. The alignment layer AL may include an alignment substrate ASUB and alignment material AM. The alignment material AM may be disposed on the alignment substrate ASUB.

Figure 13:
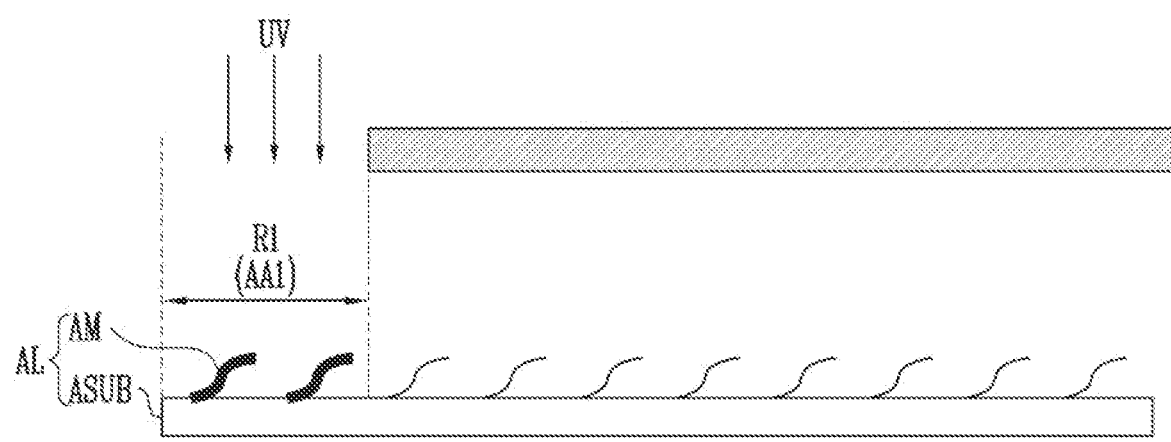
Figure 14:
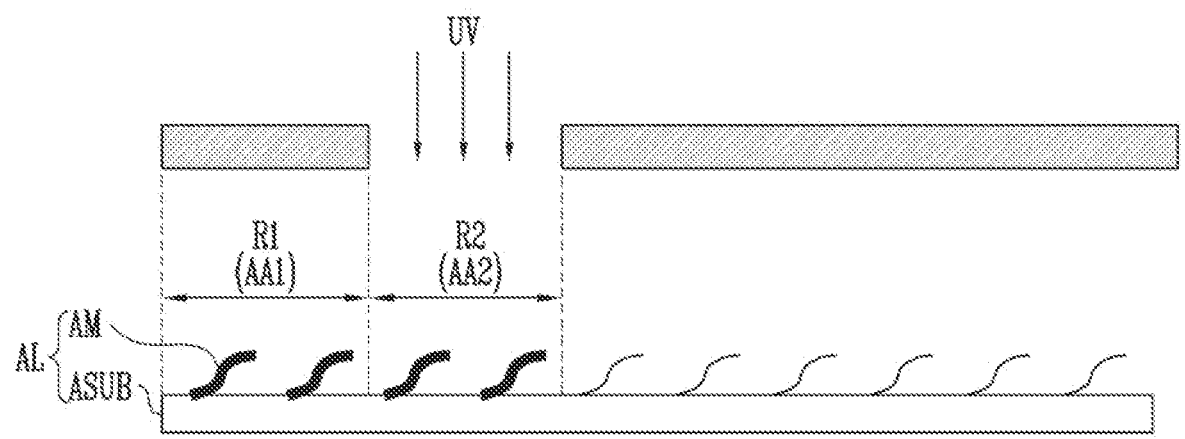
Figure 15:
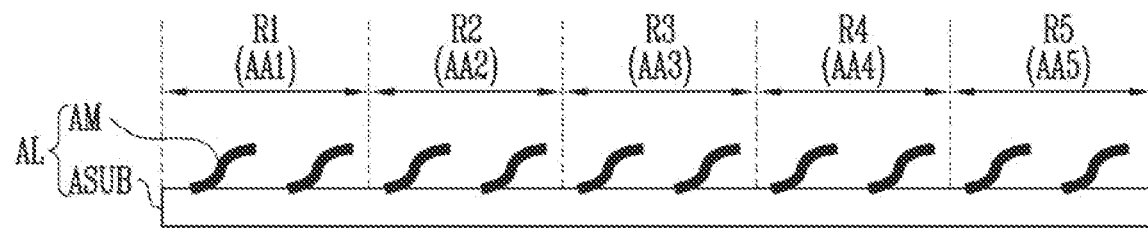

For example, the alignment material AM may be applied to the alignment substrate ASUB. Ultraviolet (UV) light polarized in a direction corresponding to the azimuthal angle AA may be irradiated onto the alignment material AM. For example, as illustrated in FIG. 13, ultraviolet (UV) light polarized in a direction corresponding to a first azimuthal angle AA1 may be irradiated onto a first region R1 of the alignment layer AL. Further, as illustrated in FIG. 14, UV light polarized in a direction corresponding to a second azimuthal angle AA2 may be irradiated onto a second region R2 of the alignment layer AL. The second region R2 may be adjacent to the first region R1.

Hence, in respective first, second, third, fourth and fifth regions R1, R2, R3, R4, and R5 of the alignment layer AL, alignment materials AM may be provided in directions corresponding to different first, second, third, fourth and fifth azimuthal angles AA1, AA2, AA3, AA4, and AA5. Liquid crystal molecules disposed on the respective alignment materials AM may be formed to have corresponding ones of the first, second, third, fourth and fifth azimuthal angles AA1, AA2, AA3, AA4, and AA5.

In the present embodiment, the optical alignment has been illustrated as the method of forming the alignment layer AL, but the present disclosure is not limited thereto. For example, the alignment layer AL may be formed using a nano-imprinting scheme.

Figure 16:
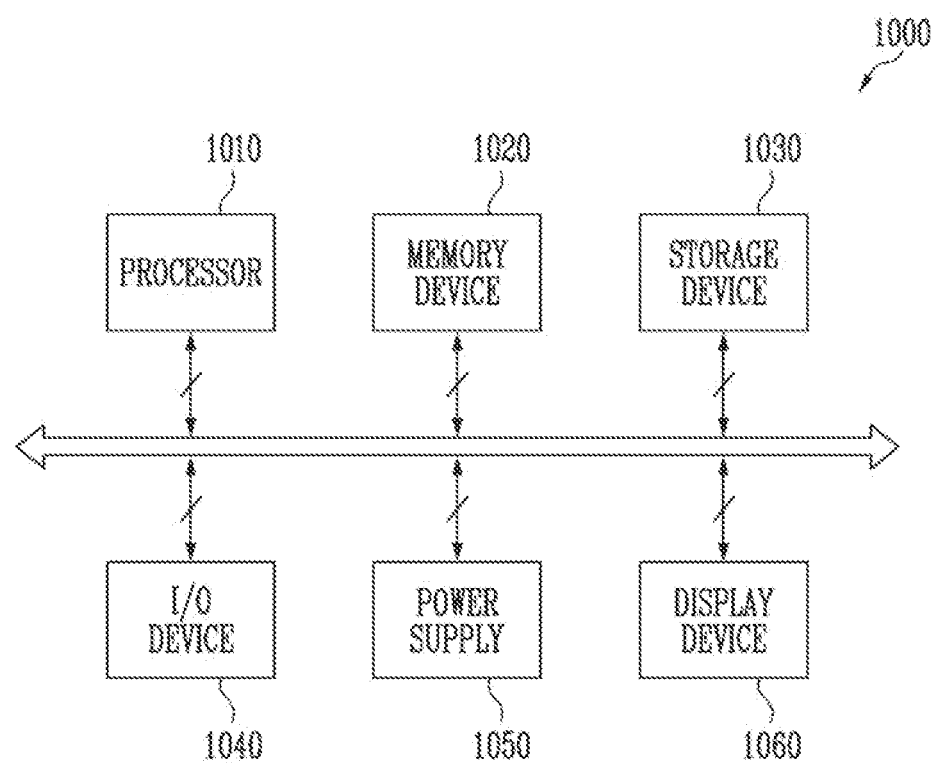
FIG. 16 is a block diagram illustrating an electronic device in accordance with embodiments of the present disclosure.

FIG. 16 is a block diagram illustrating an electronic device 1000 in accordance with embodiments of the present disclosure.

Referring to FIG. 16, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may include additional ports for communication with a video card, a sound card, a memory card, a universal serial bus (USB) device, or other systems. For example, the electronic device 1000 may be implemented as a cellular phone, a video phone, a smartpad, a smartwatch, a tablet personal computer (PC), a navigation device for vehicles, a computer monitor, a laptop computer, a head-mounted display device, and so on.

The processor 1010 may perform specific calculations or tasks. In an embodiment, the processor 1010 may be a micro processor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus.

The memory device 1020 may store data used to perform operations of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be included in the I/O device 1040.

The power supply 1050 may supply power used to perform the operations of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum dot light emitting display device, but is not limited thereto. The display device 1060 may be connected to other components through the buses or other communication links.

The present disclosure may be applied to a display device and an electronic device including the display device. For example, the present disclosure may be applied to digital TVs, 3D TVs, cellular phones, smartphones, tablet computers, virtual reality (VR) devices, PCs, home appliances, laptop computers, personal digital assistants (PDAs), portable media players (PMPs), digital cameras, music players, portable game consoles, navigation devices, and so on.

While embodiments of the present disclosure have been described above, those skilled in the art will appreciate that various modifications, additions and substitutions are possible, without departing from the scope and spirit of the present disclosure as set forth in the appended claims.

What is claimed is:
1. A display device, comprising:
a display panel;
a polarization layer on the display panel;
a liquid crystal layer on the polarization layer;
an alignment layer on the liquid crystal layer, the alignment layer having a plurality of different regions with respective alignment directions defined by exposure to ultraviolet light polarized in directions corresponding to different azimuthal angles; and a lens layer on the alignment layer, wherein the lens layer comprises polymerized liquid crystal molecules having a plurality of different azimuthal angles based on the respective alignment directions.

2. The display device according to claim 1, wherein at least one of the liquid crystal molecules comprises a reactive mesogen.

3. The display device according to claim 1,
wherein the lens layer comprises a plurality of unit lenses, and
wherein at least one of the unit lenses has a refractive index corresponding to a gradient-index (GRIN) lens for light polarized by the polarization layer.

4. The display device according to claim 1,
wherein the lens layer comprises a plurality of unit lens, and
wherein the azimuthal angles of the liquid crystal molecules in at least one of the unit lenses decreases in a first direction.

5. The display device according to claim 1,
wherein a maximum value of the azimuthal angles is 90°, and
wherein a minimum value of the azimuthal angles is −90°.

6. The display device according to claim 1, wherein a liquid crystal molecule having an azimuthal angle of 0° has a higher refractive index for light polarized by the polarization layer than a liquid crystal molecule having an azimuthal angle of 90°.

7. The display device according to claim 1,
wherein the lens layer comprises a plurality of unit lenses, and
wherein at least one of the unit lenses has a refractive index corresponding to a Fresnel lens for light polarized by the polarization layer.

8. The display device according to claim 1,
wherein the lens layer comprises a plurality of unit lenses,
wherein at least one of the unit lenses includes a first lens region and a second lens region,
wherein the azimuthal angles of the liquid crystal molecules in the first lens region and the second lens region decrease in a first direction,
wherein a maximum value of the azimuthal angles of the liquid crystal molecules in the second lens region adjacent to the first lens region in a direction opposite to the first direction is 90°, and
wherein a minimum value of the azimuthal angles of the liquid crystal molecules in the second lens region adjacent to the first lens region in the first direction is −90°.

9. The display device according to claim 8,
wherein the at least one of the unit lenses further includes an adjacent region positioned between the first lens region and the second lens region, and
wherein the azimuthal angle of the liquid crystal molecule in the adjacent region is identical to the azimuthal angle of the liquid crystal molecule in the second lens region adjacent to the adjacent region.

10. The display device according to claim 1,
wherein the lens layer comprises a plurality of unit lenses, and
wherein a length of at least one of the unit lenses is greater than or identical to 100 μm and less than or identical to 400 μm.

11. The display device according to claim 1,
wherein the lens layer comprises a plurality of sub-unit lenses each including one of the liquid crystal molecules, and
wherein a length of at least one of the sub-unit lenses is greater than or identical to 0.5 μm and less than or identical to 10 μm.

12. The display device according to claim 1, wherein a thickness of the lens layer is greater than 3 μm.

13. The display device according to claim 1, wherein a birefringence of the lens layer is greater than or identical to 0.15 and less than or identical to 0.4.

14. The display device according to claim 1, wherein the liquid crystal layer comprises a polymer dispersed liquid crystal (PDLC) layer.

15. The display device according to claim 1, wherein the liquid crystal layer scatters light polarized by the polarization layer in a two-dimensional (2D) mode, and allows light polarized by the polarization layer to pass therethrough in a three-dimensional (3D) mode.

16. A method of manufacturing a display device, comprising:
forming a display panel;
forming a polarization layer on the display panel;
forming a liquid crystal layer on the polarization layer;
forming an alignment layer on the liquid crystal layer;
irradiating the alignment layer with ultraviolet light polarized in directions corresponding to different azimuthal angles in different regions to define different alignment directions; and
forming a lens layer on the alignment layer, wherein the lens layer comprises liquid crystal molecules aligned according to a plurality of different azimuthal angles based on the different alignment directions.

17. The method according to claim 16, wherein at least one of the liquid crystal molecules comprises a reactive mesogen.

18. The method according to claim 16,
wherein the lens layer comprises a plurality of unit lenses, and
wherein at least one of the unit lenses has a refractive index corresponding to a gradient-index (GRIN) lens for light polarized by the polarization layer.

19. The method according to claim 16,
wherein the lens layer comprises a plurality of unit lenses, and
wherein at least one of the unit lenses has a refractive index corresponding to a Fresnel lens for light polarized by the polarization layer.

20. An electronic device, comprising:
a display panel;
a polarization layer on the display panel;
a liquid crystal layer on the polarization layer;
an alignment layer on the liquid crystal layer, the alignment layer having a plurality of different regions with respective alignment directions defined by exposure to ultraviolet light polarized in directions corresponding to different azimuthal angles; and
a lens layer on the alignment layer, wherein the lens layer comprises polymerized liquid crystal molecules having a plurality of different azimuthal angles based on the respective alignment directions.

* * * * *